US008578459B2

(12) United States Patent
Wood et al.

(10) Patent No.: US 8,578,459 B2
(45) Date of Patent: Nov. 5, 2013

(54) METHODS AND APPARATUS TO CONTROL NETWORK ACCESS FROM A USER DEVICE

(75) Inventors: Anthony Wood, Cedar Park, TX (US); Chad Carloss, San Antonio, TX (US); James Bert Grantges, Georgetown, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1319 days.

(21) Appl. No.: 11/669,614

(22) Filed: Jan. 31, 2007

(65) Prior Publication Data

US 2008/0181239 A1  Jul. 31, 2008

(51) Int. Cl.
H04L 29/00 (2006.01)

(52) U.S. Cl.
USPC ............... 726/6; 370/352; 370/401; 709/227; 709/228; 709/220

(58) Field of Classification Search
USPC .................. 370/352, 401; 709/227, 228, 220
See application file for complete search history.

(56) References Cited

U.S. PATENT DOCUMENTS

| 6,678,733 B1* | 1/2004 | Brown et al. ................. 709/229 |
| 2002/0004935 A1 | 1/2002 | Huotari |
| 2004/0085969 A1 | 5/2004 | Chen et al. |
| 2004/0093211 A1 | 5/2004 | Reynolds et al. |
| 2005/0169315 A1 | 8/2005 | Jiang et al. |
| 2006/0050862 A1 | 3/2006 | Shen et al. |
| 2006/0167805 A1 | 7/2006 | Manthoulis et al. |
| 2006/0239254 A1* | 10/2006 | Short et al. ................... 370/352 |

FOREIGN PATENT DOCUMENTS

| EP | 1507398 | 2/2005 |
| WO | 2004075477 | 9/2004 |

OTHER PUBLICATIONS

Partial International Search Report relating to corresponding PCT Application No. PCT/US2008/051174, mailed Jun. 30, 2008, 5 pages.
International Search Report relating to corresponding PCT Application No. PCT/US2008/051174, mailed Aug. 18, 2008, 8 pages.
Written Opinion of the International Searching Authority relating to corresponding PCT Application No. PCT/US2008/051174, mailed Aug. 18, 2008, 9 pages.
International Bureau, "International Preliminary Report on Patentability", issued in PCT/US2008/051174, issued Aug. 4, 2009, 9 pages.

* cited by examiner

Primary Examiner — Jeffrey Pwu
Assistant Examiner — Michael D Anderson
(74) Attorney, Agent, or Firm — Hanley, Flight & Zimmerman, LLC

(57) ABSTRACT

Methods and apparatus to control network access from a user device, are disclosed. An example method includes receiving a request from a user device for access to a network, receiving a first password from the user device, determining that the first password is invalid, and sending a second password and a command to the user device to cause the user device to execute an application to store the second password on a network access device associated with the user device.

10 Claims, 7 Drawing Sheets

METHODS AND APPARATUS TO CONTROL NETWORK ACCESS FROM A USER DEVICE

FIELD OF THE DISCLOSURE

This disclosure relates generally to communication systems and, more particularly, to methods and apparatus to control network access from a user device.

BACKGROUND

Network providers (e.g., internet service providers, broadband network providers, etc.) employ security techniques to prevent unauthorized users from accessing the network. For example, one method for preventing unauthorized users from accessing a digital subscriber line (DSL) connected network is to require that the user's network access equipment (e.g., customer premises equipment, residential gateway, etc.) send authentication credentials to an authentication server on the network. The authentication server verifies the credentials and provides access to the network if the credentials are valid. If the credentials are invalid, the authentication server does not enable access to the network for the equipment.

Some network providers provide webpages that allow users to configure the credentials and/or profile. After making changes to their credentials, a user will then need to manually modify the credentials stored in their user equipment.

DETAILED DESCRIPTION

Figure 1:
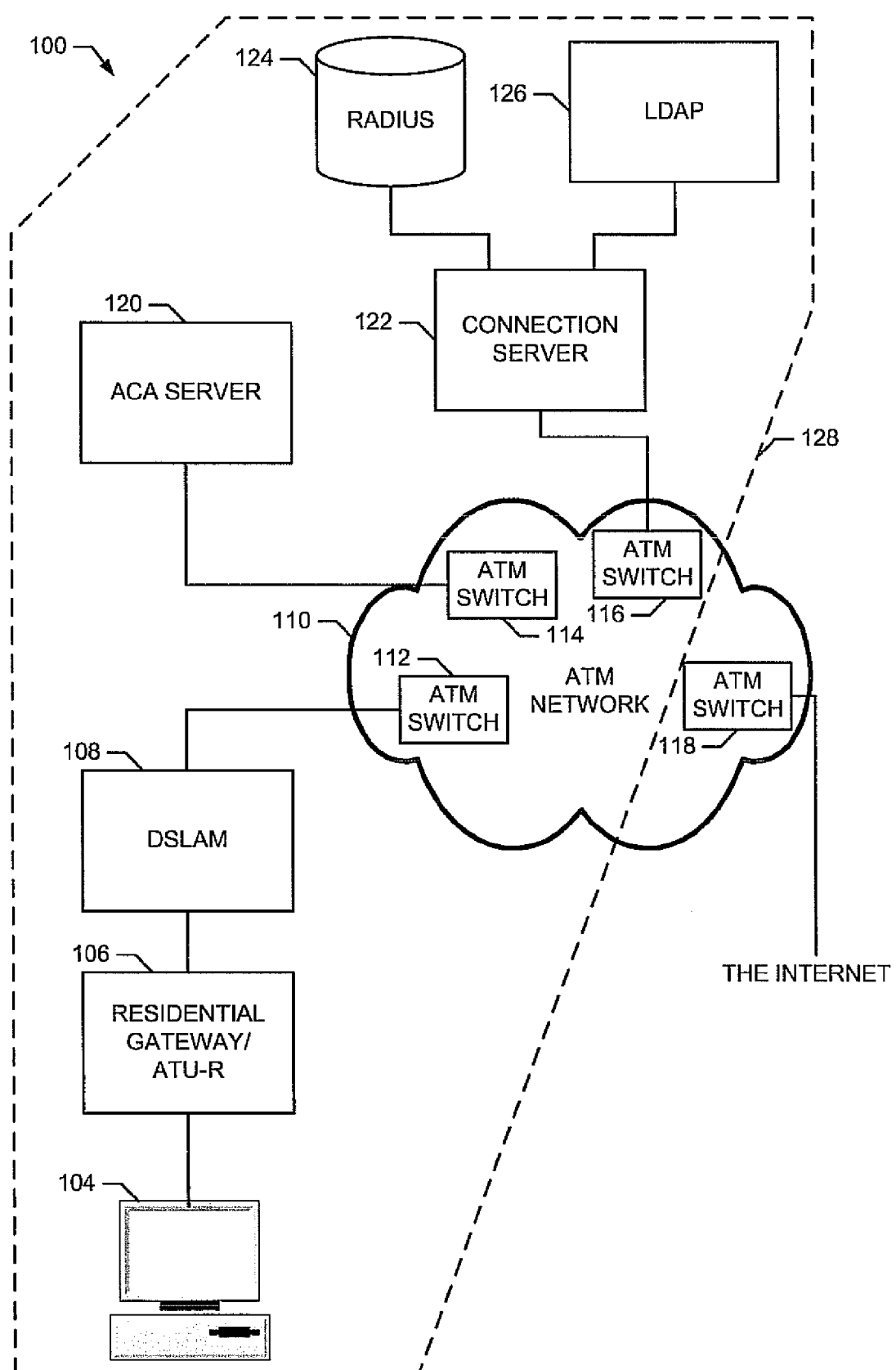
FIG. 1 is a block diagram of an example system for providing network access to a user.

FIG. 1 is a block diagram of an example system 100 for providing network access to a user. In the illustrated example, one or more user devices at a user's location send the user's credentials to a connection server 122. In the illustrated example, the user device is a residential gateway/asymmetric digital subscriber line (DSL) transmission unit remote (ATU-R) 106, but other user devices are likewise appropriate. In the illustrated example, the connection server 122 cooperates with a remote authentication dial in user service (RADIUS) server 124 and a lightweight directory access protocol (LDAP) server 126 to determine if the supplied credentials are valid. If it is determined that the supplied credentials are invalid, the connection server 122 of the illustrated example redirects the one or more user devices to the (ACA) server 120 and restricts access for the one or more user devices to networks within a walled garden 128. The ACA server 120 of the illustrated example then provides instructions to the user device for configuring the user credentials stored at the user device. Once the credentials stored at the user device are corrected, the user device is allowed to access devices outside of the walled garden 128 (e.g., the internet, other devices in the network hosting the walled garden, other devices outside the network hosting the walled garden, etc.).

The example system 100 of FIG. 1 includes a computer 104, the residential gateway/ATU-R 106, a DSL access multiplexer (DSLAM) 108, an asymmetric transfer mode (ATM) network 110, a first ATM switch 112, a second ATM switch 114, a third ATM switch 116, a fourth ATM switch 118, an automated customer assistance (ACA) server 120, the connection server 122, the RADIUS server 124, the LDAP server 126, and the walled garden 128.

The computer 104 of the illustrated example is capable of communicating with one or more networked devices (e.g., devices communicatively coupled to the computer 104 via the residential gateway/ATU-R 106 and any other intervening network components). For example, the computer 104 is capable of displaying a webpage received from the ACA server 120 and/or another device on the internet. The example computer 104 is communicatively coupled with the residential gateway/ATU-R 106. The computer 104 may be any type of computing device such as, for example, a personal computer, a desktop computer, a laptop computer, an embedded device computer, a mobile phone, a portable digital assistant (PDA), a set top box (STB), an internet protocol television (IPTV) transceiver, a computer integrated in another device, etc.

The residential gateway/ATU-R 106 of the illustrated example may be one or both of a residential gateway or an ATU-R. The example residential gateway/ATU-R 106 communicatively couples the computer 104 to the connection server 122. The example residential gateway/ATU-R 106 stores credentials that may be used for authenticating with the connection server 122. For example, the residential gateway/ATU-R 106 of the illustrated example stores a username, a password, a serial number, an account number, and/or any other type of credential. The example residential gateway/ATU-R 106 may include the capability to be accessed for remote management (e.g., may be capable of receiving and carrying out remote management commands) from a remote device (e.g., the connection server 122). For example, the residential gateway/ATU-R 106 may support the TR069 remote management protocol. In addition, the residential gateway/ATU-R 106 is capable of being managed by the computer 104. For example, the residential gateway/ATU-R 106 may provide an application program interface and a web server serving administration webpages to allow configuration by a local device such as the computer 104. The residential gateway/ATU-R 106 may be any other type of device that is capable of communicatively coupling the computer 104 to the DSLAM 108 such as, for example, any type of customer premises equipment (CPE), a set top box (STB), etc.

The DSLAM 108 of the illustrated example communicatively couples the residential gateway/ATU-R 106 with the first ATM switch 112 in the ATM network 110. While only a single connection to a residential gateway/ATU-R is illustrated, the DSLAM 108 will likely be connected to additional residential gateways/ATU-Rs. While the system 100 of the illustrated example describes DSL communication equipment, persons of ordinary skill in the art will recognize that other similarly operating communication mediums may be used (e.g., cable server, dial up server, and/or satellite server). In addition, any type of communication protocol may be used such as, for example, asymmetric DSL (ADSL), high speed DSL (HDSL), very high speed DSL (VDSL), data over cable service interface specification (DOCSIS), any other cable network provider protocol, integrated service digital network (ISDN), a fiber optic network provider protocol, etc.

The first ATM switch 112 of the illustrated example provides a connection point to enable the DSLAM 108 to connect to the ATM network 110. The example first ATM switch 112 of FIG. 1 is capable of providing communication via the ATM network 110 to the second ATM switch 114, the third ATM switch 116, and/or the fourth ATM switch 118. Persons of ordinary skill in the art will recognize that, while an ATM network is illustrated and described, any other type of network and/or network protocol may be used.

The second ATM switch 114 of the illustrated example provides a connection point to enable the ACA server 120 to connect to the ATM network 110. The third ATM switch 116 of the illustrated example provides a connection point to enable the connection server 122 to connect to the ATM network 110. The fourth ATM switch 118 of the illustrated example provides a connection point to enable the ATM network 110 to connect to the internet.

The ACA server 120 of the illustrated example provides computerized customer service information inside of the walled garden 128. The example ACA server 120 includes a webserver for serving one or more webpages to one or more user devices (e.g., the computer 104). The webpage(s) served by the example ACA server 120 provide network provider contact information, application(s) that may be downloaded and executed by user(s), instruction(s) for user(s), user device manual(s), etc.

The ACA server 120 of the illustrated example, provides a start page when a first request for information is received. The start page allows a user to input credentials (e.g., a username and a password). The ACA server 120 of FIG. 1 is capable of determining if the credentials are valid (e.g., by contacting the RADIUS server 124). The ACA server 120 of FIG. 1 is additionally capable of providing a webpage with a menu of options from which a user may select. For instance, the menu may include an option to request troubleshooting information, an option to request software updates and/or installs, an option to select storage of the proper user credentials at the residential gateway/ATU-R 106, etc.

An example implementation of the ACA server 120 of the illustrated example is described in further detail in conjunction with FIGS. 3-6.

The connection server 122 of the illustrated example manages requests for connection to the ATM network 110. When a residential gateway/ATU-R 106 attempt to connect to the ATM network 110, the residential gateway/ATU-R 106 sends a request for connection to the connection server 122. The request includes the credentials that are stored at the residential gateway/ATU-R 106. The connection server 122 queries the RADIUS server 124 with the credentials. If the RADIUS server 124 indicates that the credentials are valid, the connection server 122 provisions the residential gateway/ATU-R 106 for access to the internet (e.g., provides the residential gateway/ATU-R 106 with an internet protocol (IP) address that will allow requests from the residential gateway/ATU-R 106 to be routed to the internet). In the illustrated example, the RADIUS server 124 indicates that the credentials are invalid, the connection server 122 (and/or the RADIUS server 124) redirects the request to the ACA server 120. For example, the connection server 122 may direct all requests (e.g., a request for any webpage) originating from the rich presence server 106 to the ACA server 120.

The RADIUS server 124 of the illustrated example stores and verifies authentication information. In addition, the example RADIUS server 124 stores accounting information related to users of the system 100. The example RADIUS server 124 is capable of redirecting user requests from the residential gateway/ATU-R 106 to a different location using, for example, a hyperlink uniform resource locator (HURL) redirect. While a RADIUS server is illustrated in FIG. 1, any type of authentication server may be used in addition to or in place of the RADIUS server.

The LDAP server 126 of the illustrated example stores and distributes information about devices in the system 100. For example, the LDAP server 126 stores information about the residential gateway/ATU-R 106 and any IP addresses assigned to the residential gateway/ATU-R 106 by the connection server 122 and/or the RADIUS server 124. While an LDAP server is illustrated in FIG. 1, any type of directory services server may be used in addition to or in place of the LDAP server 126.

The walled garden 128 of the illustrated example is illustrated by a dashed line in FIG. 1. The area inside of the walled garden 128 is accessible to the residential gateway/ATU-R 106 whether or not the device has sent valid credentials to the connection server 122 and/or the RADIUS server 124. The area outside of the walled garden 128 is inaccessible to the residential gateway/ATU-R 106 when the device has not sent valid credentials to the connection server 122 and/or the RADIUS server 124. Persons of ordinary skill in the art will recognize that there are many ways in which the walled garden effect may be realized such as, for example, causing the ATM network 110 to route all requests from a residential gateway/ATU-R 106 subject to the restrictions of the walled garden 128 to a predefined location, providing the residential gateway/ATU-R 106 with an IP address that cannot route outside of the walled garden 128, etc.

Figure 2:
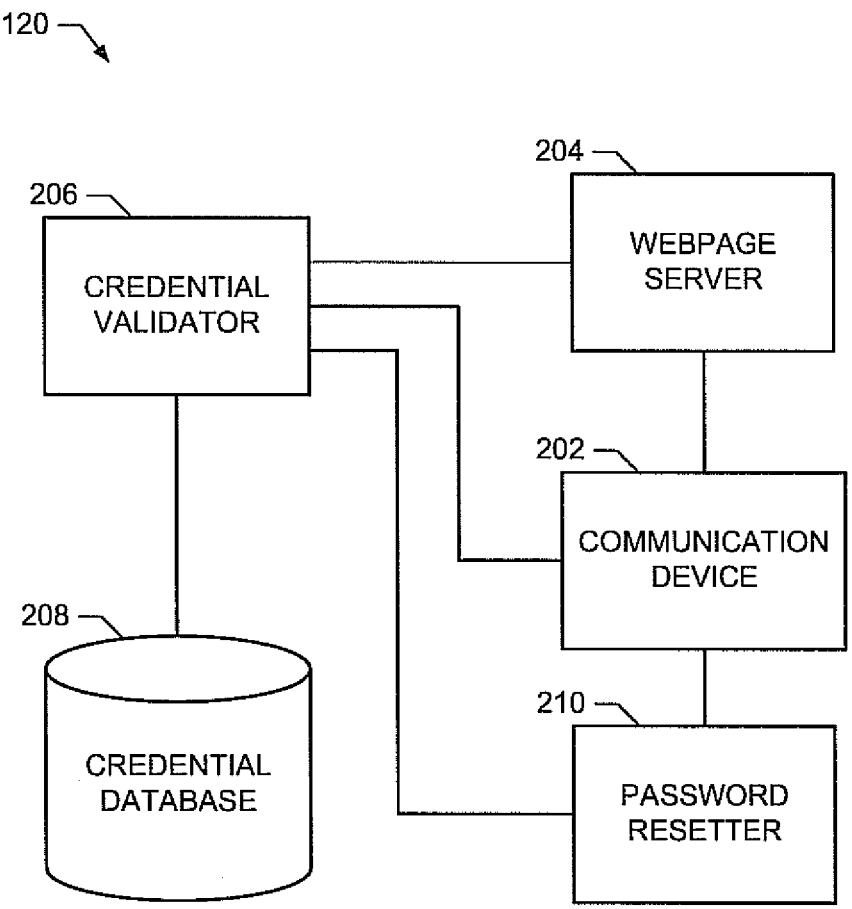
FIG. 2 is a block diagram of an example implementation of the ACA server of FIG. 1.

FIG. 2 is a block diagram of an example implementation of the ACA server 120 of FIG. 1. The example ACA server 120 of FIG. 2 includes a communication device 202, a webpage server 204, a credential validator 206, a credential database 208, and a password resetter 210.

The communication device 202 communicatively couples the example ACA server 120 with the ATM switch 114 and the devices connected to the ATM network 110. For example, the communication device 202 enables the ACA server 120 to communicate with the computer 104 via the ATM switch 112, the DSLAM 108, and the residential gateway/ATU-R 106. In addition, the communication device 202 enables the ACA server 120 to communicate with the connection server 122 and the RADIUS server 124 via the ATM switch 116.

The webpage server 204 of the illustrated example receives requests for webpages and sends webpages and/or applications in response to the requests. The example webpage server 204 receives requests for webpages (including webpages on the internet) redirected from the connection server 122 and, in response, sends a webpage that requests user credentials, sends a webpage with troubleshooting information, sends a webpage with information on updating software, etc. In addition, the example webpage server 204 may send an application that is capable of storing credentials on a network connection device at a user location (e.g., the residential gateway/ATU-R 106).

The credential validator 206 of the illustrated example receives credentials from network users (e.g., from the residential gateway/ATU-R 106 and/or the computer 104) and determines if the credentials are valid (e.g., authorize the network user for access to the network. The credential validator 206 compares the received credentials to records in the credential database 208. In an alternate embodiment the credential validator 206 may query the RADIUS server 124 of FIG. 1 to determine if received credentials are valid. in another alternate embodiment, the credential validator 206 may be eliminated and all credential validation may be accomplished by the RADIUS server 124.

The credential database 208 of the illustrated example is a database storing records of credential information. The credential information indicates which credentials are authorized for accessing the network outside of the walled garden. The credential information may also indicate that credentials are associated with an account that is not enabled (e.g., the account has been cancelled, the account is overdue for a payment, etc.). While the credential database 208 is described as a database, the credential database 208 may alternatively be any type of data storage such as, for example, one or more files, a spreadsheet, a hard drive storing files, etc.

The password resetter 210 of the illustrated example uses a remote management protocol to store credentials on a network connection device at a user location (e.g., the residential gateway/ATU-R 106). The password resetter 210 receives the instruction to store the credentials from the webpage server 204 and/or the credential validator 206. In addition, the password resetter 210 receives the credentials to be stored from the webpage server 204 (e.g., credentials received from the user as a submission to a webpage) or the credential validator 206 (e.g., credentials that have been validated or extracted from the credential database 208). Alternatively, the password resetter 210 may operate in conjunction with the webpage server 204 to send an application to the computer 104 to cause the computer 104 to store the credentials at the network connection device.

FIGS. 3-6 are flowcharts representative of example machine readable instructions that may be executed to implement the computer 104, the example ACA server 120, the example connection server 122, the example RADIUS server 124, the example LDAP server 126 of FIG. 1 and the example communication device 202, the example webpage server 204, the example credential validator 206, and the example password resetter 208 of FIG. 2. The example machine readable instructions of FIGS. 3-6 may be executed by a processor, a controller, and/or any other suitable processing device. For example, the example machine readable instructions of FIGS. 3-6 may be embodied in coded instructions stored on a tangible medium such as a flash memory, or random access memory (RAM) associated with a processor (e.g., the processor 1012 shown in the example processor platform 1000 and discussed below in conjunction with FIG. 7). Alternatively, some or all of the example flowcharts of FIGS. 3-6 may be implemented using an application specific integrated circuit (ASIC), a programmable logic device (PLD), a field programmable logic device (FPLD), discrete logic, hardware, firmware, etc. In addition, some or all of the example flowcharts of FIGS. 3-6 may be implemented manually or as combinations of any of the foregoing techniques, for example, a combination of firmware, software, and/or hardware. Further, although the example system 100 is implemented by executing the example machine readable instructions represented by the flowcharts of FIGS. 3-6, persons of ordinary skill in the art will readily appreciate that many other methods of implementing the computer 104, the example ACA server 120, the example connection server 122, the example RADIUS server 124, the example LDAP server 126 of FIG. 1 and the example communication device 202, the example webpage server 204, the example credential validator 206, and the example password resetter 208 of FIG. 2 may be employed. For example, the order of execution of the blocks may be changed, and/or some of the blocks described may be changed, eliminated, sub-divided, and/or combined. Additionally, persons of ordinary skill in the art will appreciate that the example machine readable instructions of FIGS. 3-6 be carried out sequentially and/or carried out in parallel by, for example, separate processing threads, processors, devices, circuits, etc.

Figure 3:
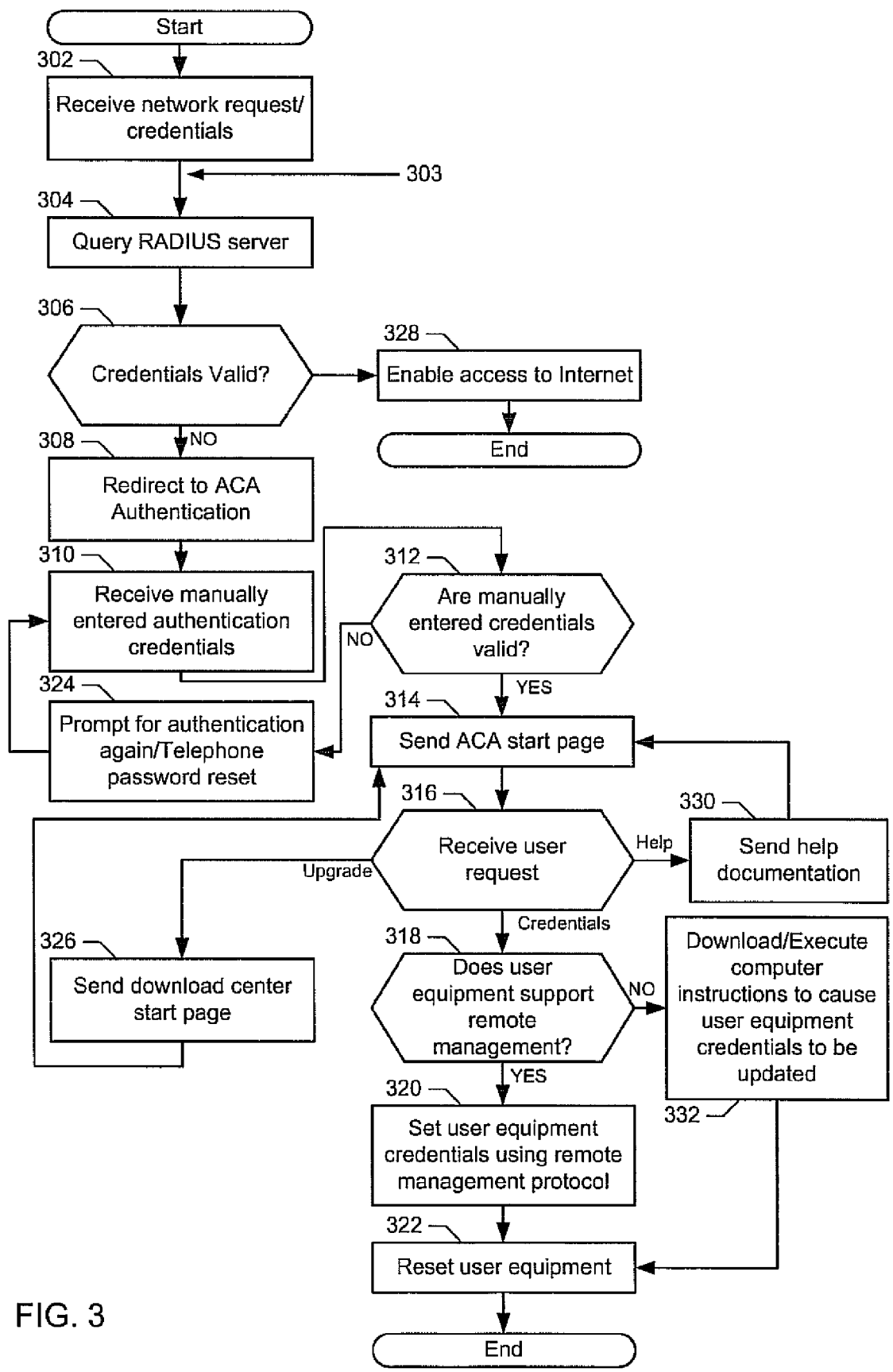
FIG. 3 is a flowchart representative of example machine readable instructions that may be executed to modify credentials stored at the residential gateway/ATU-R of FIG. 1.

FIG. 3 is a flowchart representative of example machine readable instructions that may be executed to modify credentials stored at the residential gateway/ATU-R 106 of FIG. 1. The example machine readable instructions of FIG. 1 begin when the connection server 122 receives a network access request and credentials for a user from the residential gateway/ATU-R 106 (block 302). For example, the credentials may be point to point protocol over Ethernet (PPPoE) credentials. The connection server 122 then queries the example RADIUS server 124 to determine if the credentials are valid (block 304). If the credentials are valid, the connection server 122 provisions the example residential gateway/ATU-R 106 for access to the internet (block 328) and the machine readable instructions of FIG. 3 are ended.

If the example RADIUS server 124 indicates that the credentials are invalid (e.g., the user changed their credentials with the network provider but did not upgrade the credentials stored at the residential gateway/ATU-R 106) (block 306), the connection server 122 and/or the RADIUS server 124 redirects the request from the user to the authentication page (e.g., a webpage that includes a form for inputting credentials) of the webpage server 204 of the ACA server 120 (block 308). The webpage server 204 then receives the input credentials (e.g., after the user has input the credentials and selected submit) (block 310). Then, the example credential validator 206 of the ACA server 120 determines if the received credentials are valid (e.g., by querying the credential database 208 and/or by querying the RADIUS server 124 with the manual input) (block 312). If the received credentials are invalid, the example webpage server 204 sends a page requesting re-entry of the credentials or provides information for resetting the password over the telephone (e.g., by calling a customer support telephone number) (block 324). Control then returns to block 310 to await further credentials from the user. In an alternative implementation, the ACA server 120 may determine if the credentials correspond to an account that is inactive or flagged (e.g., due to a failure to pay a bill). The ACA server 120 may provide messages that enable troubleshooting of the problem and/or may direct the user to contact customer support to resolve the problem.

If the received credentials are found to be valid (block 312), there is a mismatch between the user's credentials and the credentials stored in the user's device. Therefore, the example webpage server 204 sends the start page/menu (block 314). For example, the start page/menu displays a welcome message and provides options for the user to select to troubleshoot connection problems and/or credential verification issues. The webpage server 204 then receives a user request based on the options available on the start page (block 316).

If the user request is for a software upgrade (block 316), the webpage server 204 sends a software download page to the residential gateway/ATU-R 106 and services any download requests (block 326). Control then returns to block 316 to await further user requests.

If the user request is for a credential update/correction (block 316), the example password resetter 210 determines if the user's equipment (e.g., the residential gateway/ATU-R 106) supports remote management (e.g., remote management via the TR069 protocol) (block 318). If the user's equipment does not support remote management, control proceeds to block 332, which is described below. If the user's equipment supports remote management, the password resetter 210 sends remote management protocol commands to the user equipment to instruct the user equipment to store the user credentials received in block 310 (block 320). The ACA password resetter 210 then resets (e.g., power cycles, soft reset, hard reset, etc.) the user equipment to cause the new credentials to be transmitted to the connection server 122 (block 322) to enable verification that the credential problem has been fixed. The ACA server 120 may cause the reset to occur by sending remote management commands and/or may instruct the user to manually reset the user equipment. Then, the machine readable instructions of FIG. 3 are ended.

Figure 5:
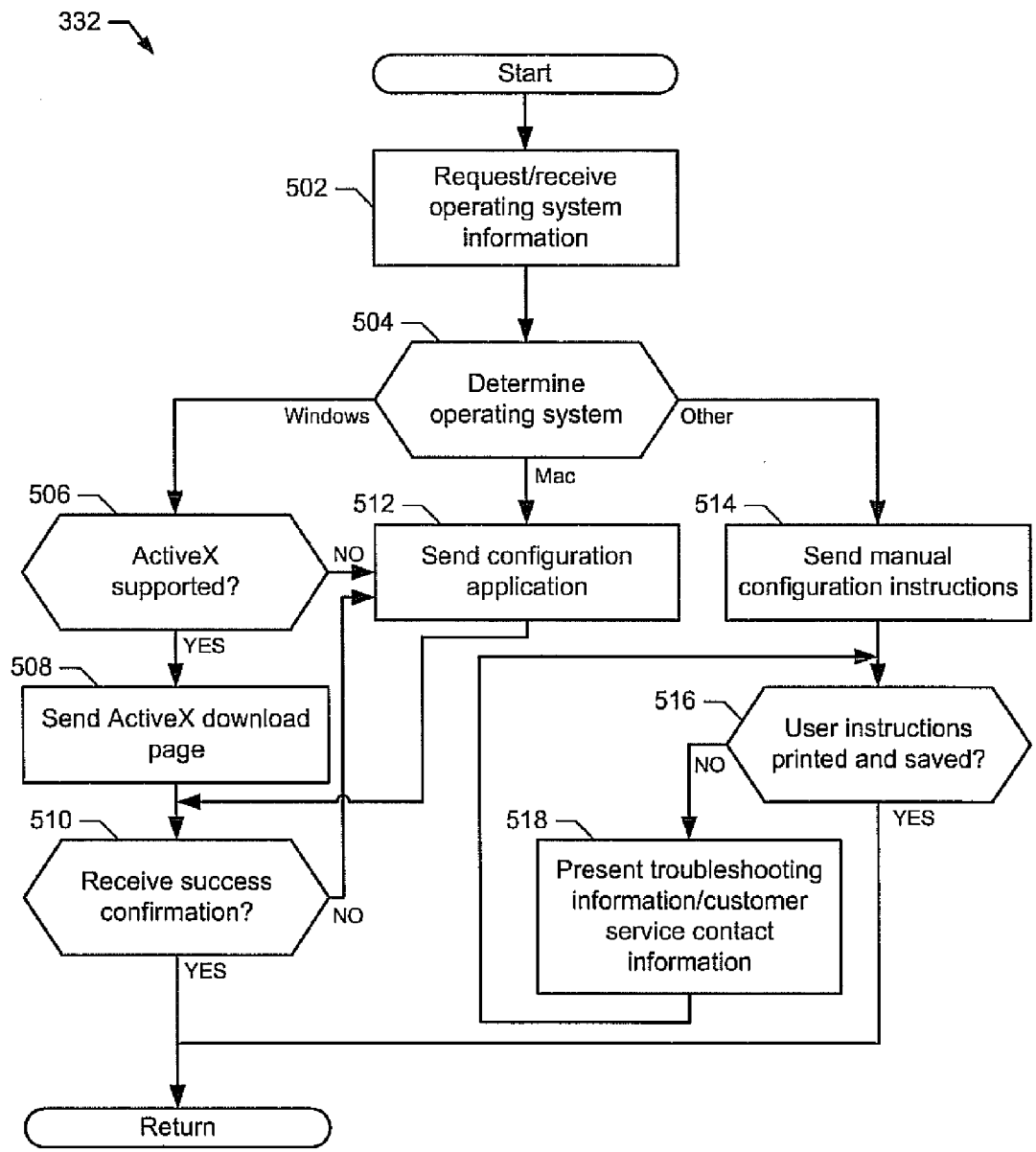
FIG. 5 is a flowchart representative of example machine readable instructions that may be executed to implement block of FIG. 3.

Returning to block 318, if the user equipment does not support remote management, the password resetter 210 and/or webpage server 204 sends executable instructions and/or requests execution of executable computer instructions at the user equipment (e.g., on the example computer 104) (block 332). When executed (after, for example, user approved consent), the executable computer instructions cause the credentials received in block 310 to be stored at the user equipment (e.g., the residential gateway/ATU-R 106 and used future communication). A flowchart representative of example machine readable instructions that may be executed to implement block 332 are illustrated in FIG. 5. After the executable computer instructions are sent and/or executed, control proceeds to block 322.

Returning to block 316, if the user request is for help documentation, the webpage server 204 sends a page indicating the available documentation and servicing requests for that information (block 330). Control then returns to block 314.

Figure 4:
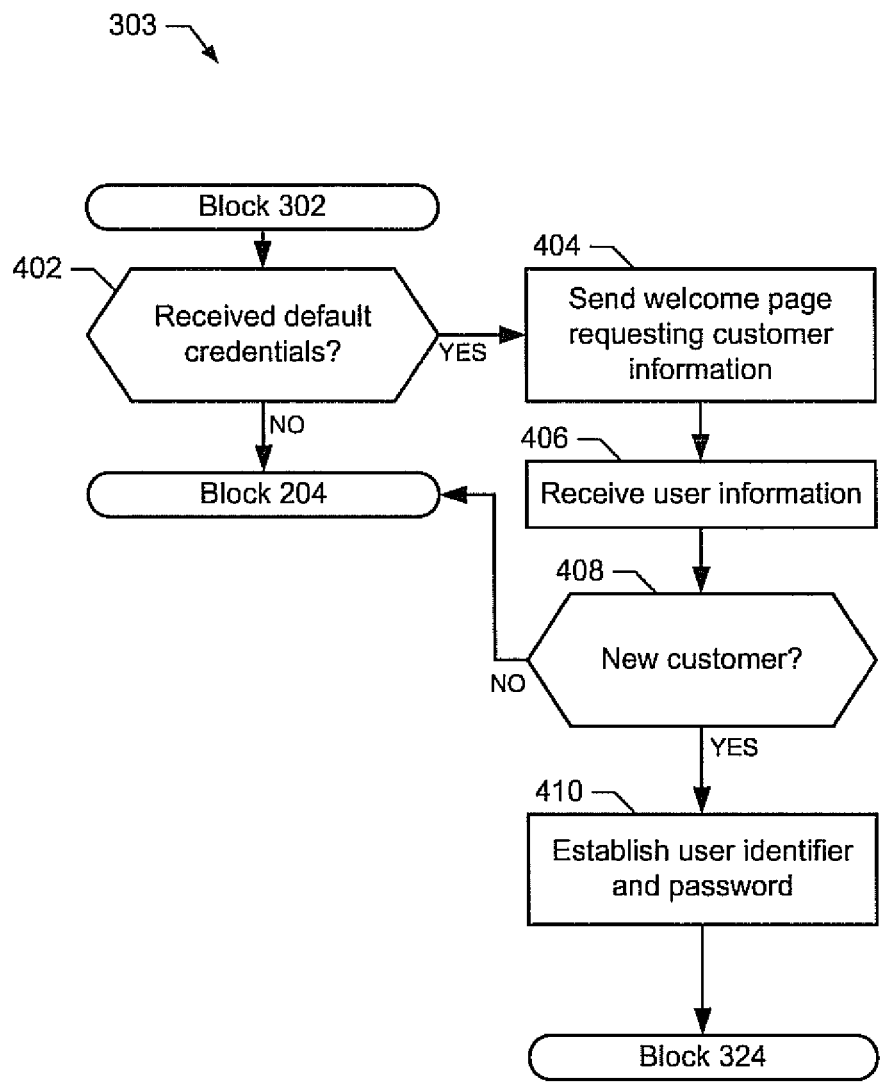
FIG. 4 is a flowchart representative of example machine readable instructions that may be inserted at label of FIG. 3 in an alternate implementation.

FIG. 4 is a flowchart representative of example machine readable instructions that may be inserted at label 303 of FIG. 3 in an alternate implementation. Block 402 of FIG. 4 begins after the connection server 122 of FIG. 1 receives a request and credentials from the residential gateway/ATU-R 106 in block 302 of FIG. 3. The example connection server 122 determines if the received credentials are default credentials (e.g., the credentials stored at the residential gateway/ATU-R 106 by the manufacturer of the device) (block 402). If the received credentials are not default credentials, control proceeds to block 304 of FIG. 3.

If example connection server 122 determines that the received credentials are default credentials (block 402), then the device may be, for example, a newly purchased device, and the connection server 122 redirects the request to a welcome page at the example ACA server 120 (block 404). The welcome page provides a welcome message and requests information (e.g., name, address, telephone number, etc.) from a user. The ACA server 120 receives the input user information (block 406). The ACA server 120 then determines if the user information indicates that the user is a new user (e.g., a user that has not connected to the network in the past) (block 408). For example, the ACA server 120 may determine if an input telephone number matches a record at the RADIUS server 124 and/or the LDAP server 126. If the user information does not indicate that the user is a new user (e.g., the user is an known or existing user), control proceeds to block 304 to continue processing the user.

If the ACA server 120 determines that the user is a new user, the ACA server 120 in conjunction with the connection server 122, the RADIUS server 124, and/or the LDAP server 126 establishes a user identifier and password for the user (e.g., by requesting the user to enter a user name and password and verify that at least one of the entered username and password are unique) (block 410). The ACA server 120 may additionally collect further information from the user (e.g., a payment method). Control then proceeds to block 324 to store the newly created credentials at the user equipment (e.g., the residential gateway/ATU-R 106).

FIG. 5 is a flowchart representative of example machine readable instructions that may be executed to implement block 332 of FIG. 3. The example machine readable instructions of FIG. 5 follow the determination that the user equipment does not support remote management and, therefore, the user equipment will be configured from the user location (e.g., using the computer 104). The example machine readable instructions of FIG. 5 begin when the ACA server 120 requests and/or receives information about the operating system executing at the user equipment (e.g., the computer 104) that is being used to send the request from the residential gateway/ATU-R 106 (block 502). For example, the ACA server 120 may query the LDAP server 126 for information about the user equipment (e.g., mold number, serial no., etc.). The ACA server 120 then determines an operating system based on the information (block 504). (In some examples, the name and/or version number of the operating system are provided at block 502).

If the ACA server 120 determines that the user equipment is using a Microsoft® Windows® operating system, the ACA server 120 determines if the user equipment and software support ActiveX applications (block 506). For example, the ACA server 120 may determine if the user is using a web browser that supports ActiveX (e.g., Microsoft Internet Explorer®) or a web browser that does not support ActiveX (e.g., Mozilla® Firefox®). Alternatively or additionally, the ACA server 120 may verify that the user equipment supports any other type of software application. If the user equipment does not support ActiveX, control proceeds to block 512, which is described below.

If the user equipment supports ActiveX (block 506), the ACA server 120 sends an ActiveX application to the user equipment (e.g., via a download) (block 508). The example ActiveX application is executed by the web browser of the user equipment and communicates with the user's residential gateway/ATU-R to store updated credentials on the device. The ACA server 120 then determines if a confirmation of a successful execution has been received (block 510). If a successful execution confirmation has been received (block 510), control proceeds to block 512. If a successful execution has been received, the machine readable instructions of block 332 complete and control returns to block 322 of FIG. 3.

Returning to block 504 of FIG. 5, if the ACA server 120 determines that the user equipment is executing a Mac® operating system, the ACA server 120 sends a configuration application to the user equipment (block 512). For example, the ACA server 120 may determine or query a user as to what type of application may be executed by the user equipment (e.g., a universal binary, a Windows binary, a PowerPC (PPC) binary, etc.). As described in the previous paragraph, block 512 is additionally executed after a determination that the user equipment does not support ActiveX (block 506) and/or after a determination that an ActiveX execution was not successful (block 510). In addition to sending a configuration application, the ACA server 120 may display instructions regarding how the configuration application may be executed. Control then advances to block 510 to determine if the execution of the configuration application was successful (e.g., the application may send a confirmatory message to the ACA server 120 indicating that the execution was or was not successful).

Returning to block 504, if the ACA server 120 determines that the user equipment is executing an operating system other than Microsoft Windows or a Mac operating system, the ACA server 120 will send manual configuration instructions to the user equipment (e.g., a webpage with instructions on configuring the residential gateway/ATU-R 106 to include the correct credentials) (block 514). The ACA server 120 will then wait for a confirmatory message to confirm whether the instructions were saved and printed (block 516). If the instructions have been printed and saved, the machine readable instructions of block 332 complete, and control returns to block 322 of FIG. 3. If the instructions have not been printed and saved (block 516), the ACA server 120 forwards further troubleshooting information for printing and saving and/or forwards information for contacting customer service to the user device (block 518). Control then returns to block 516.

Figure 6:
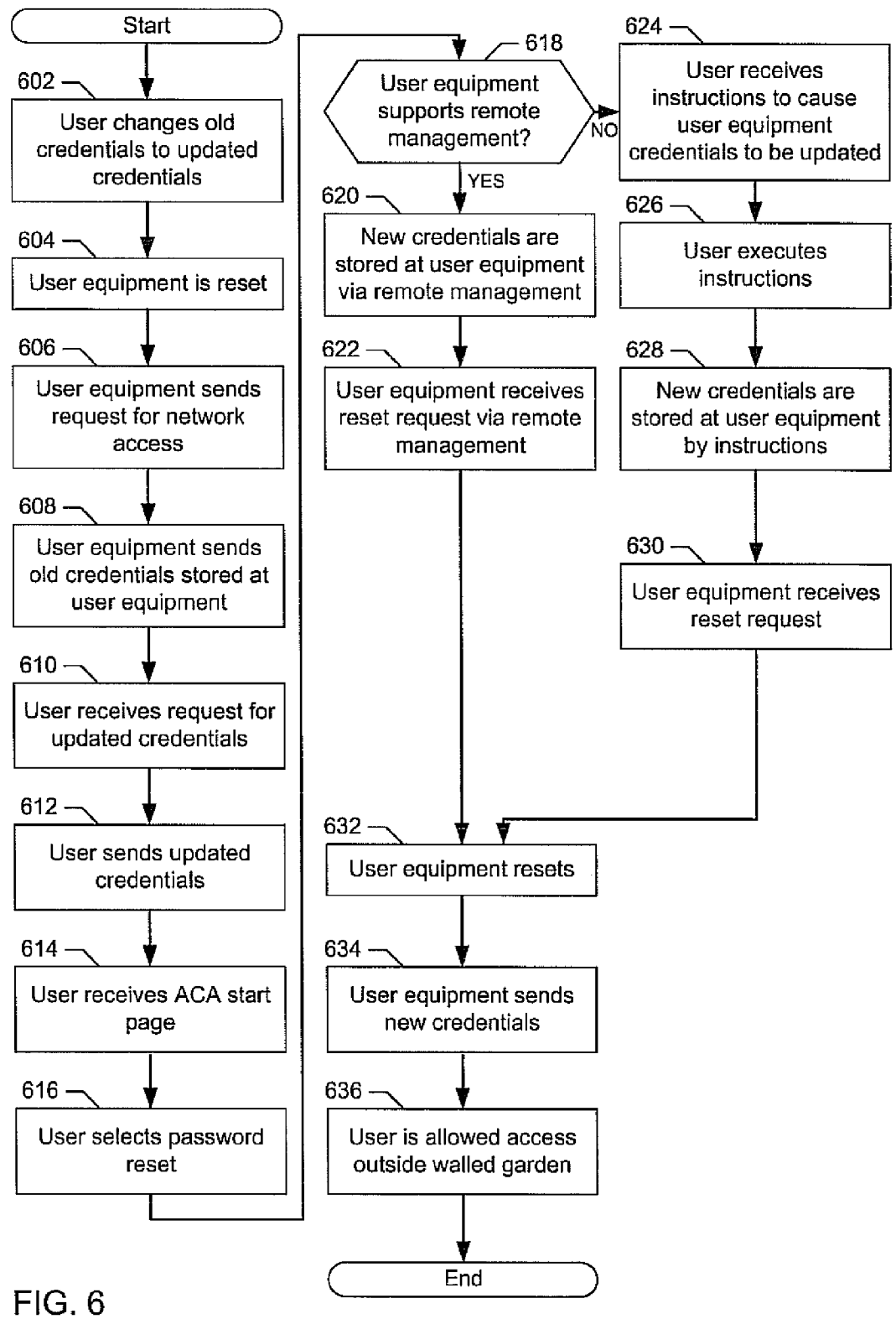
FIG. 6 is a flowchart representative of an example user interaction with the system of FIG. 1.

FIG. 6 is a flowchart representative of an example user interaction with the system 100 of FIG. 1. The flowchart of FIG. 6 begins when a user makes a modification changing their old credentials to new credentials (block 602). For example, the user may visit a network provider webpage, change their password, and not update the password stored in the user equipment. Typically, the user equipment will continue to be connected to the network until the user equipment is reset or the connection to the network is lost (e.g., a cable is temporarily disconnected) (block 604).

Once the user equipment is turned on or reconnected to the network, the user equipment sends a request for access to the network to the connection server 122 (block 606). Unless it was manually updated, the user equipment then sends the old credentials stored at the user equipment to the connection server 122 (block 608). When this occurs, because the old credentials do not match the new credentials as updated by the user, the user equipment receives a request for credentials to the user (e.g., via a webpage displayed in a web browser) from the ACA server 120 (block 610). In response to the request, the user inputs and sends the updated credentials to the ACA server 120 (block 612).

Assuming that the user has input the correct new credentials, the user receives the ACA start page from the ACA server 120 (block 614). The user then selects a button to reset the password stored at the user equipment (e.g., the residential gateway/ATU-R 106) (block 616). If the user equipment does not support remote management (block 618), control proceeds to block 624, which is described below.

If the user equipment does support remote management (block 618), the new credentials are stored at the user equipment by the ACA server 120 via the remote management protocol (e.g., TR069) (block 620). The user equipment then receives a reset request via the remote management protocol (block 622). Control then proceeds to block 632, which is described below.

Turning to block 624, when the user equipment does not support remote management, the user receives instructions for updating the credentials stored at the user equipment (block 624). The instructions may be computer instructions that may be executed to cause a computer to perform the update, or may be instructions for a user to follow to manually update the user equipment. Either way the user executes the commands (e.g., using a computer or manually) (block 626), the new credentials are stored at the user equipment (block 628). Subsequently, the user equipment receives a reset request (e.g., a reset request from computer instructions or a manual reset request from a user) (block 630). Control then proceeds to block 632.

Turning to block 632, after receiving a reset request, the user equipment resets itself (block 632). After booting back up, the user equipment sends the new credentials stored at the user equipment to the connection server 122 (block 634). When the new credentials are validated, the user and the user equipment are allowed access outside of the walled garden (e.g., are allowed access to the internet) (block 636).

Figure 7:
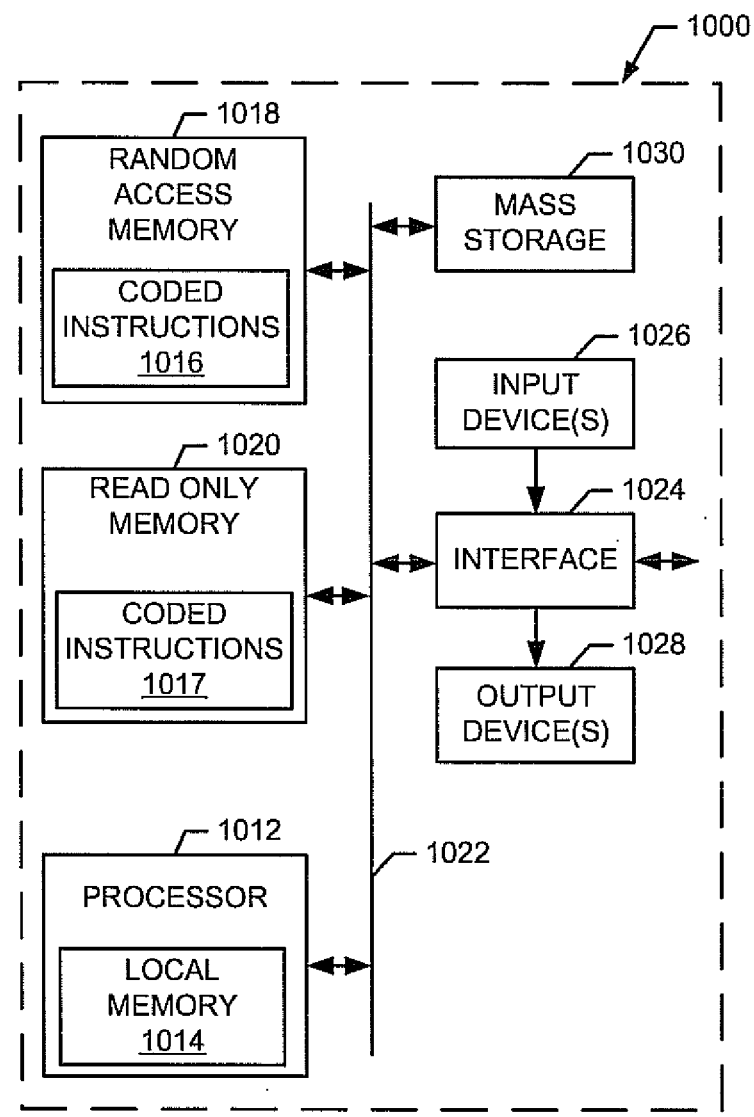
FIG. 7 is a block diagram of an example computer that may execute the machine readable instructions of FIGS. 3, 4, 5, and/or 6 to implement the example system of FIG. 1.

FIG. 7 is a block diagram of an example computer platform 1000 capable of executing the machine readable instructions illustrated in FIGS. 3, 4, 5, and/or 6 to implement the system 100 and/or the other apparatus and/or methods disclosed herein.

The computer platform 1000 of the instant example includes a processor 1012 such as a general purpose programmable processor. The processor 1012 includes a local memory 1014, and executes coded instructions 1016 present in random access memory 1018, coded instruction 1017 present in the read only memory 1020, and/or instructions present in another memory device. The processor 1012 may execute, among other things, the machine readable instructions represented in FIGS. 3, 4, 5, and/or 6. The processor 1012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1025. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown) in a conventional manner.

The computer 1000 also includes a conventional interface circuit 1024. The interface circuit 1024 may be implemented by any type of well known interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1030 for storing software and data. Examples of such mass storage devices 1030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for configuring a user device for network access, the method comprising:
   receiving a request from a gateway device associated with the user device for access to a network, the request including a first password;
   determining that the first password is invalid;
   determining that the gateway device supports remote management; and
   sending a second password and a command to the user device, the command to cause the user device to execute an application, the application to store the second password on the gateway device via a Technical Report 69 (TR069) remote management protocol.

2. A method as defined in claim 1, further comprising:
   sending a webpage that requests a password to the user device;
   receiving the second password from the user device; and
   determining that the second password is valid, wherein sending the command is performed when the second password is valid.

3. A method as defined in claim 1, wherein causing the user device to execute the application is based on a supported capability of the gateway device.

4. A method as defined in claim 1, further comprising sending the application to the user device.

5. A method as defined in claim 4, wherein the application is executed by a web browser.

6. A method as defined in claim 4, further comprising determining an operating system associated with the user device, wherein the application is selected to be compatible with the operating system.

7. A method as defined in claim 1, further comprising redirecting a request for network access to an automated customer assistance server.

8. A method as defined in claim 7, wherein the request includes an identifier of a requested webpage.

9. A method as defined in claim 1, wherein the gateway device is a residential gateway and an asymmetric digital subscriber line transmission unit remote.

10. A method as defined in claim 9, wherein the user device is a computing device connected to the gateway device, the user device to receive network access via the gateway device.

* * * * *